United States Patent
Craig et al.

(10) Patent No.: US 7,360,138 B2
(45) Date of Patent: Apr. 15, 2008

(54) VERIFICATION OF THE DESIGN OF AN INTEGRATED CIRCUIT BACKGROUND

(75) Inventors: Jesse Ethan Craig, South Burlington, VT (US); Suzanne Granato, Essex Junction, VT (US); Francis A. Kampf, Jeffersonville, VT (US); Barbara L. Powers, Hinesburg, VT (US)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 11/276,295

(22) Filed: Feb. 23, 2006

(65) Prior Publication Data

US 2007/0220386 A1    Sep. 20, 2007

(51) Int. Cl.
*G06F 11/00* (2006.01)
(52) U.S. Cl. ........................... 714/741; 714/739
(58) Field of Classification Search .................. 716/4, 716/5; 714/37, 741, 739
See application file for complete search history.

(56) References Cited

U.S. PATENT DOCUMENTS

| | | | | |
|---|---|---|---|---|
| 6,526,551 | B2 * | 2/2003 | Xie et al. | 716/5 |
| 6,647,513 | B1 * | 11/2003 | Hekmatpour | 714/37 |
| 7,149,987 | B2 * | 12/2006 | Zhu et al. | 716/4 |
| 7,181,708 | B1 * | 2/2007 | Du et al. | 716/5 |

OTHER PUBLICATIONS

Kedarnath J. Balakrishnan et al. Member, IEEE, "Relationship Between Entropy and Test Data Compression." IEEE Transactions on Computer-Aided Design of Integrated Circuits and Systems, vol. 26, No. 2, Feb. 2007 pp. 386-389.

* cited by examiner

*Primary Examiner*—David Ton
(74) *Attorney, Agent, or Firm*—Ryan K. Simmons

(57) ABSTRACT

A method, apparatus, and computer program product for performing verification on an integrated circuit design having state variables. Random vectors are generated, used to simulate the design, and generate a set of values for the state variables. The generated values are compared to groups having stored values from previous stimulations and either a new group is created for the generated set of values or the existing groups accurately represent the generated set of values and they are stored in one of the existing groups.

25 Claims, 5 Drawing Sheets

| Time | Signal A | Signal B | Signal C | Signal D | Signal E |
|---|---|---|---|---|---|
| 1 | 1 | 1 | 1 | 1 | 0 |
| 2 | 0 | 1 | 0 | 1 | 0 |
| 3 | 1 | 1 | 1 | 1 | 0 |
| 4 | 0 | 1 | 0 | 1 | 0 |
| 5 | 1 | 1 | 1 | 0 | 0 |
| 6 | 0 | 1 | 0 | 1 | 0 |
| 7 | 1 | 0 | 0 | 0 | 1 |
| 8 | 0 | 0 | 0 | 0 | 1 |
| 9 | 1 | 0 | 1 | 1 | 0 |
| 10 | 1 | 0 | 0 | 1 | 0 |
| 11 | 0 | 0 | 1 | 1 | 1 |
| 12 | 1 | 0 | 1 | 1 | 0 |
| 13 | 0 | 1 | 0 | 0 | 0 |
| 14 | 0 | 1 | 0 | 1 | 1 |
| 15 | 0 | 0 | 0 | 0 | 1 |
| 16 | 1 | 1 | 1 | 0 | 0 |

*Figure 3*

| Time | Signal A | Signal B | Signal C | Signal D | Signal E |
|---|---|---|---|---|---|
| 1 | 0.5 | 1 | 1 | 1 | 0 |
| 2 | 0.5 | 1 | 0 | 1 | 0 |
| 3 | 0.5 | 1 | 1 | 1 | 0 |
| 4 | 0.5 | 1 | 0 | 1 | 0 |
| 5 | 0.5 | 1 | 1 | 0 | 0 |
| 6 | 0.5 | 1 | 0 | 1 | 0 |
| 7 | 0.5 | 0 | 0 | 0 | 1 |
| 8 | 0.5 | 0 | 0.5 | 1 | 0 |
| 9 | 0.5 | 0 | 0.5 | 1 | 1 |
| 10 | 0.5 | 0 | 0.5 | 1 | 0 |
| 11 | 0.5 | 1 | 0.5 | 0 | 0 |
| 12 | 0.5 | 1 | 0.5 | 1 | 1 |
| 13 | 0.5 | 0 | 0.5 | 0 | 1 |
| 14 | 0.5 | 1 | 0.5 | 0 | 0 |

*Figure 4*

| Time | A | | B | | C | | Weighted Difference (A vs. B) | Weighted Difference (B vs. C) | Weighted Difference (A vs. C) |
|---|---|---|---|---|---|---|---|---|---|
| | Control | Data | Control | Data | Control | Data | | | |
| 1 | 0 | 0 | 1 | 1 | 1 | 1 | 60.23 | 0.00 | 60.23 |
| 2 | 0 | 0 | 1 | 0 | 1 | 0 | 52.09 | 0.00 | 52.09 |
| 3 | 0 | 0 | 1 | 0 | 1 | 1 | 52.09 | 8.14 | 60.23 |
| 4 | 0 | 0 | 0 | 0 | 0 | 1 | 0.00 | 8.14 | 8.14 |
| 5 | 0 | 0 | 0 | 1 | 0 | 1 | 8.14 | 0.00 | 8.14 |
| 6 | 0 | 1 | 0 | 0 | 0 | 0 | 8.14 | 0.00 | 8.14 |
| 7 | 0 | 1 | 0 | 0 | 0 | 1 | 8.14 | 8.14 | 0.00 |
| 8 | 0 | 1 | 0 | 0 | 0 | 0 | 8.14 | 0.00 | 8.14 |
| 9 | 0 | 1 | 1 | 0 | 1 | 0 | 60.23 | 0.00 | 60.23 |
| 10 | 0 | 1 | 0 | 1 | 0 | 1 | 0.00 | 0.00 | 0.00 |
| 11 | 0 | 1 | 0 | 0 | 0 | 1 | 8.14 | 8.14 | 0.00 |
| 12 | 0 | 1 | 0 | 0 | 0 | 1 | 8.14 | 8.14 | 0.00 |
| 13 | 0 | 0 | 0 | 1 | 0 | 1 | 8.14 | 0.00 | 8.14 |
| 14 | 0 | 1 | 0 | 1 | 0 | 1 | 0.00 | 0.00 | 0.00 |
| 15 | 0 | 1 | 0 | 1 | 0 | 1 | 0.00 | 0.00 | 0.00 |
| 16 | 0 | 0 | 0 | 0 | 0 | 1 | 0.00 | 8.14 | 8.14 |
| 17 | 0 | 1 | 0 | 1 | 0 | 0 | 0.00 | 8.14 | 8.14 |
| 18 | 0 | 1 | 0 | 1 | 0 | 0 | 0.00 | 8.14 | 8.14 |
| 19 | 0 | 0 | 1 | 1 | 1 | 0 | 60.23 | 8.14 | 52.09 |
| 20 | 0 | 1 | 0 | 0 | 0 | 0 | 8.14 | 0.00 | 8.14 |
| 21 | 0 | 0 | 0 | 1 | 0 | 1 | 8.14 | 0.00 | 8.14 |
| 22 | 0 | 1 | 0 | 0 | 0 | 0 | 8.14 | 0.00 | 8.14 |
| 23 | 0 | 1 | 0 | 1 | 0 | 1 | 0.00 | 0.00 | 0.00 |
| 24 | 0 | 1 | 0 | 1 | 0 | 1 | 0.00 | 0.00 | 0.00 |
| 25 | 0 | 1 | 0 | 1 | 0 | 0 | 0.00 | 8.14 | 8.14 |
| 26 | 0 | 0 | 0 | 1 | 0 | 1 | 8.14 | 0.00 | 8.14 |
| 27 | 1 | 0 | 0 | 1 | 0 | 1 | 60.23 | 0.00 | 60.23 |
| 28 | 0 | 1 | 0 | 0 | 0 | 1 | 8.14 | 8.14 | 0.00 |
| 29 | 0 | 0 | 0 | 0 | 0 | 1 | 0.00 | 8.14 | 8.14 |
| 30 | 0 | 0 | 0 | 0 | 0 | 1 | 0.00 | 8.14 | 8.14 |
| 31 | 0 | 0 | 0 | 0 | 0 | 0 | 0.00 | 0.00 | 0.00 |
| 32 | 0 | 0 | 0 | 0 | 0 | 0 | 0.00 | 0.00 | 0.00 |
| 33 | 0 | 0 | 0 | 1 | 0 | 1 | 8.14 | 0.00 | 8.14 |
| 34 | 0 | 1 | 0 | 1 | 0 | 0 | 0.00 | 8.14 | 8.14 |
| 35 | 0 | 1 | 0 | 1 | 0 | 0 | 0.00 | 8.14 | 8.14 |
| 36 | 0 | 1 | 0 | 0 | 0 | 0 | 8.14 | 0.00 | 8.14 |
| 37 | 0 | 0 | 0 | 1 | 0 | 0 | 8.14 | 8.14 | 0.00 |
| 38 | 0 | 1 | 0 | 1 | 0 | 1 | 0.00 | 0.00 | 0.00 |
| 39 | 0 | 0 | 0 | 0 | 0 | 0 | 0.00 | 0.00 | 0.00 |
| 40 | 0 | 1 | 0 | 0 | 0 | 1 | 8.14 | 8.14 | 0.00 |
| 41 | 0 | 0 | 0 | 0 | 0 | 0 | 0.00 | 0.00 | 0.00 |
| 42 | 0 | 1 | 0 | 1 | 0 | 1 | 0.00 | 0.00 | 0.00 |
| 43 | 0 | 1 | 0 | 1 | 0 | 0 | 0.00 | 8.14 | 8.14 |
| 44 | 1 | 1 | 0 | 1 | 0 | 1 | 52.09 | 0.00 | 52.09 |
| 45 | 0 | 0 | 0 | 1 | 0 | 1 | 8.14 | 0.00 | 8.14 |
| 46 | 0 | 1 | 0 | 1 | 0 | 1 | 0.00 | 0.00 | 0.00 |
| 47 | 0 | 1 | 0 | 1 | 0 | 0 | 0.00 | 8.14 | 8.14 |
| 48 | 0 | 0 | 0 | 0 | 0 | 0 | 0.00 | 0.00 | 0.00 |
| 49 | 0 | 1 | 0 | 0 | 0 | 0 | 8.14 | 0.00 | 8.14 |

*Figure 5*

| Difference Determination |||||
|---|---|---|---|
| | Difference | Normalized Difference | Different ? |
| Total Difference (A vs. B) | 584.08 | 1.30 | 1 |
| Total Difference (B vs. C) | 211.30 | 0.47 | 0 |
| Total Difference (A vs. C) | 551.57 | 1.23 | 1 |

*Figure 6*

VERIFICATION OF THE DESIGN OF AN INTEGRATED CIRCUIT BACKGROUND

BACKGROUND

1. Technical Field of the Present Invention

The present invention generally relates to integrated circuit designs and, more specifically, to verification of an integrated circuit design.

2. Description of Related Art

The manufacture of an integrated circuit has become extremely complex and expensive. As a result, simulating and testing the design of the integrated circuit prior to manufacture has become an essential requirement. Simulation and testing is performed using software, emulation systems, and the like to detect and correct design flaws.

A portion of the testing involves verification of the design. Verification of the design is often a complex and time-consuming process as a result of the millions of transistors that are typically required to implement the design. Complete design specification and verification are often not practical, particularly with complex integrated circuits and tight commercial release dates.

One approach of performing verification uses random generated test vectors. The random test vectors are applied to the design and the results compared against a correct model of the design. Random testing is time consuming and risky since there is no guarantee that all the bugs in the design will be discovered or a way to measure how well the design space was tested.

It would, therefore, be a distinct advantage to have a method, apparatus, and computer program product that would provide an indication when random testing has reached a desired level. It would be further advantageous if the random testing data was stored and tracked in a manner so as to produce a set of test data that could be used on subsequent iterations of the design.

SUMMARY OF THE PRESENT INVENTION

In one aspect, the present invention is a method of verifying the design of an integrated circuit having one or more state variables. The method includes the steps of generating a first random vector and simulating the design with the first random vector to create a first set of values for the one or more state variables. The method also includes the step of comparing the first set of values with one or more groups each having one or more sets of stored values for the one or more state variables that were generated during a prior simulation of the design. The method further includes the step of storing the first set of values in the one or more groups if the first set of values are within a desired tolerance of the one or more sets of stored values.

In addition, the step of comparing can include the step of calculating an entropy for each of the one of the first set of values and stored set of values. The step of comparing can also include the step of weighting each one of the entropies according to a predetermined scheme. The step of comparing can further include the step of calculating the difference between the weighted entropies for the first set of values and the weighted entropies of the stored set of values.

The step of storing can also include the step of storing the first set of values in the one or more groups if the calculated difference between the first set of values and one or more of the stored set of values is less than a desired tolerance.

The desired tolerance can be the normalized difference between the first set of values and the stored set of values.

The step of storing can further include the step of compressing the first set of values and the stored set of values to reduce concurrent sets and average values. The step of compressing can include the step of defining a window size for encompassing a portion of the first set of values and the stored set of values. The step of compressing can also include the step of averaging the values of the portion of the first set of values if the average of the first set of values is within a desired range. The step of compressing can include the step of averaging the values of the portion of the stored set of values if the average of the stored set of values is within a desired range.

The verifying method can also include the steps of generating a second random vector and simulating the design with the second random vector to create a second set of values for the one or more state variables. The verification method can further include the step of comparing the second set of values with the one or more groups. The verification method can also include the step of determining that the second set of values reside within a desired tolerance of the one or more sets of stored values.

BRIEF DESCRIPTION OF THE DRAWINGS

The present invention will be better understood and its advantages will become more apparent to those skilled in the art by reference to the following drawings, in conjunction with the accompanying specification, in which:

FIG. 3 is a table illustrating an example of a portion of an AET that is stored in its entirety according to the teachings of the present invention;

FIG. 4 is a table illustrating lossy compression applied to the table of FIG. 3 according to the teachings of the present invention;

FIG. 5 is a table illustrating the AET results of three test cases A, B, and C and the application of the test case harvesting of FIG. 2 according to the teachings of the present invention; and FIG. 6 is a table illustrating the total weighted differences between the test cases A, B, and C of FIG. 5 according to the teachings of the present invention.

DETAILED DESCRIPTION OF THE PREFERRED EMBODIMENT OF THE PRESENT INVENTION

The present invention is a method, apparatus, and computer program product for performing design verification using random generated vectors. These vectors are used to stimulate the design so as to alter the values of the state variables of the design. The values of the state variables are weighted according to predetermined criteria, recorded (either compressed or uncompressed), and grouped. As new values are generated from a particular simulation, these values are weighted and compared to the existing groups. In one embodiment, the new values are combined with existing groups that sufficiently represent the combination of new values or a new group is created. In an alternative embodiment, each time a new set of values are generated, the new values and stored values are weighted, recorded, and re-grouped. In another alternative embodiment of the present invention, groups are predefined and the new values are stored in one or more groups or a new group is created.

As the number of new groups that are created in response to the stimuli decreases, the coverage of the verification of the design increases as explained below.

Figure 1:
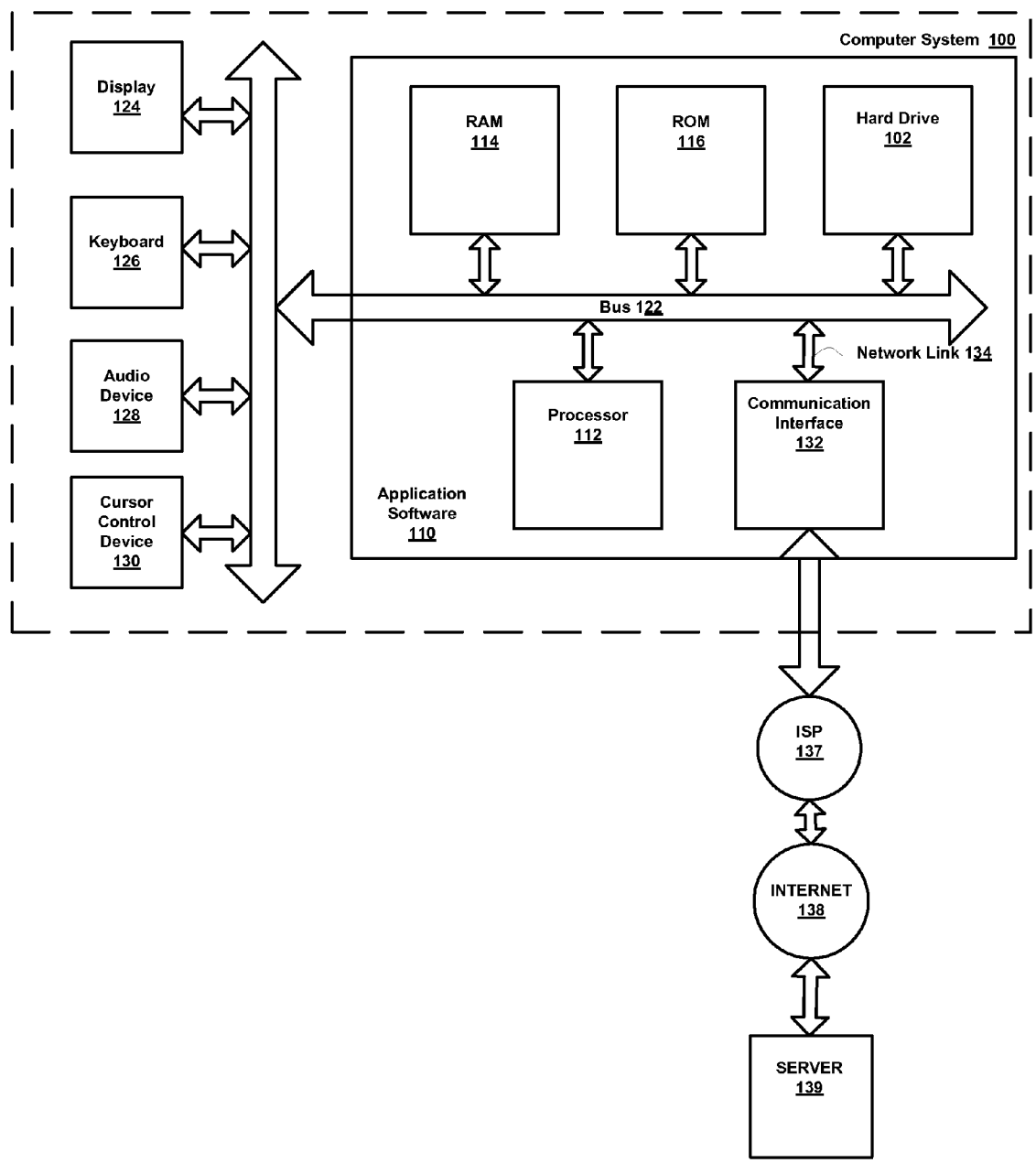
FIG. 1 is a block diagram illustrating a computer system that implements a preferred embodiment of the present invention.

Reference now being made to FIG. 1, a block diagram is shown illustrating a computer system 100 that implements a preferred embodiment of the present invention. Computer System 100 includes various components each of which is explained in greater detail below.

Bus 122 represents any type of device capable of providing communication of information within Computer System 100 (e.g., System bus, PCI bus, cross-bar switch, etc.)

Processor 112 can be a general-purpose processor (e.g., the PowerPC™ manufactured by IBM or the Pentium™ manufactured by Intel) that, during normal operation, processes data under the control of an operating system and application software 110 stored in a dynamic storage device such as Random Access Memory (RAM) 114 and a static storage device such as Read Only Memory (ROM) 116. The operating system preferably provides a graphical user interface (GUI) to the user.

The present invention, including the alternative preferred embodiments, can be provided as a computer program product, included on a machine-readable medium having stored on it machine executable instructions used to program computer system 100 to perform a process according to the teachings of the present invention.

The term "machine-readable medium" as used in the specification includes any medium that participates in providing instructions to processor 112 or other components of computer system 100 for execution. Such a medium can take many forms including, but not limited to, non-volatile media, and transmission media. Common forms of non-volatile media include, for example, a floppy disk, a flexible disk, a hard disk, magnetic tape, or any other magnetic medium, a Compact Disk ROM (CD-ROM), a Digital Video Disk-ROM (DVD-ROM) or any other optical medium whether static or rewriteable (e.g., CDRW and DVD RW), punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the preferred embodiment, an example of a non-volatile medium is the Hard Drive 102.

Volatile media includes dynamic memory such as RAM 114. Transmission media includes coaxial cables, copper wire or fiber optics, including the wires that comprise the bus 122. Transmission media can also take the form of acoustic or light waves, such as those generated during radio wave or infrared data communications.

Moreover, the present invention can be downloaded as a computer program product where the program instructions can be transferred from a remote computer such as server 139 to requesting computer system 100 by way of data signals embodied in a carrier wave or other propagation medium via network link 134 (e.g., a modem or network connection) to a communications interface 132 coupled to bus 122.

Communications interface 132 provides a two-way data communications coupling to network link 134 that can be connected, for example, to a Local Area Network (LAN), Wide Area Network (WAN), or as shown, directly to an Internet Service Provider (ISP) 137. In particular, network link 134 may provide wired and/or wireless network communications to one or more networks.

ISP 137 in turn provides data communication services through the Internet 138 or other network. Internet 138 may refer to the worldwide collection of networks and gateways that use a particular protocol, such as Transmission Control Protocol (TCP) and Internet Protocol (IP), to communicate with one another. ISP 137 and Internet 138 both use electrical, electromagnetic, or optical signals that carry digital or analog data streams. The signals through the various networks and the signals on network link 134 and through communication interface 132, which carry the digital or analog data to and from computer system 100, are exemplary forms of carrier waves transporting the information.

In addition, multiple peripheral components can be added to computer system 100. For example, audio device 128 is attached to bus 122 for controlling audio output. A display 124 is also attached to bus 122 for providing visual, tactile or other graphical representation formats. Display 124 can include both non-transparent surfaces, such as monitors, and transparent surfaces, such as headset sunglasses or vehicle windshield displays.

A keyboard 126 and cursor control device 130, such as mouse, trackball, or cursor direction keys, are coupled to bus 122 as interfaces for user inputs to computer system 100.

The execution of application software 110 on computer system 100 is explained in greater detail in connection with FIG. 2.

Figure 2:
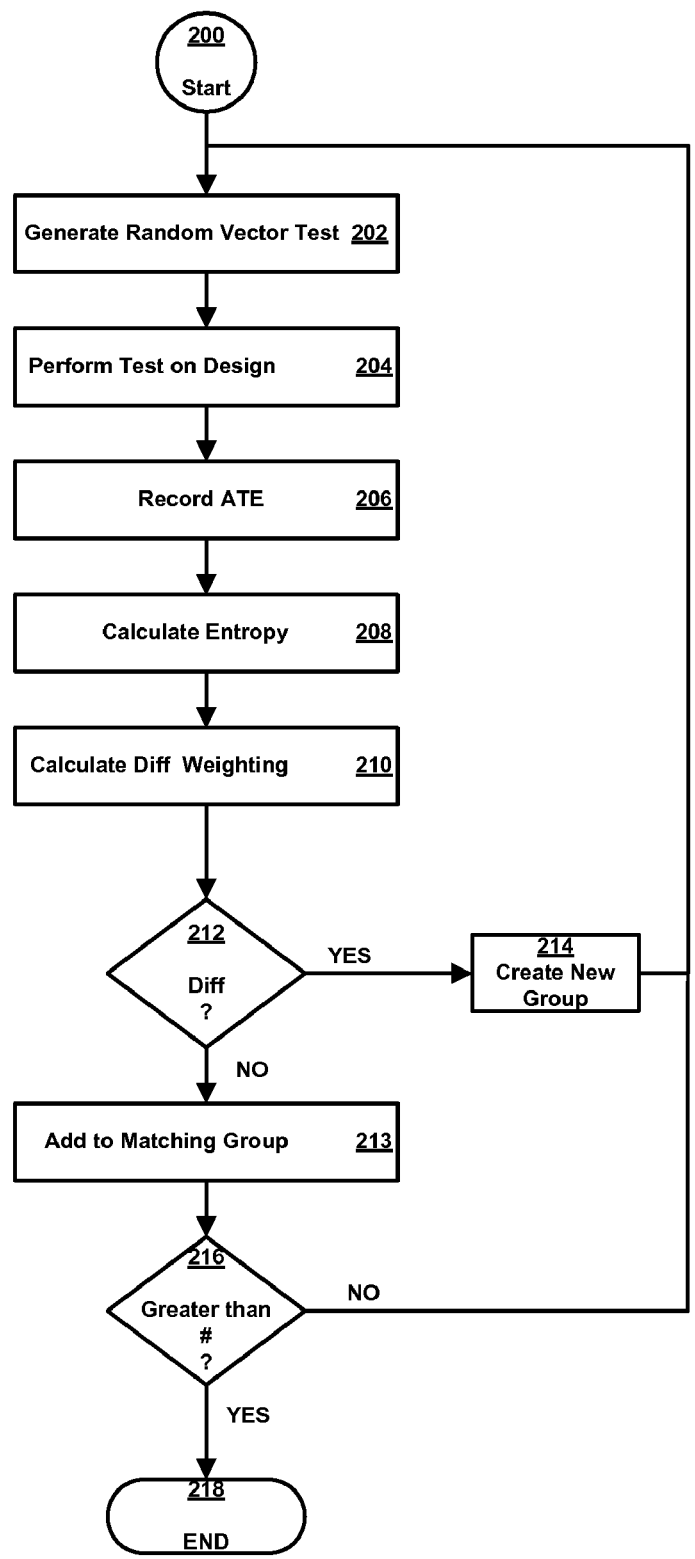
FIG. 2 is a flow chart illustrating the method of pattern test harvesting according to the teachings of the present invention.

Reference now being made to FIG. 2, a flow chart is shown illustrating the method of pattern test harvesting according to the teachings of the present invention.

The test harvesting begins by randomly generating a unique test vector for a specific design (Steps 200-202). The test vector is then used to stimulate the design and the state of all the storage elements of the design (state variables) are saved during the simulation. (Steps 204-206). In other words, the contents of all latches and inputs to the design under test are saved (All Event Trace (AET)) (Step 206).

Obviously, the amount of storage required to save the AET is directly proportional to the complexity of the design. The preferred embodiment of the present invention stores the AET in its entirety on storage device 102 (or a remote storage area).

Reference now being made to FIG. 3, a table is shown illustrating an example of a portion of an AET that is stored in its entirety according to the teachings of the present invention. State variables Signals A-E are illustrated for times 1-16.

If storage space is a concern or a limitation then compression can be applied to the AET to save the amount of storage space required. In an alternative preferred embodiment of the present invention, a lossy compression storage technique is used to remove redundant elements and compress the AET. More specifically, a window for a given size n is used for recording the AETs residing in the window and applying lossy compression.

In general, the lossy compression examines the state variables, in a defined window space, that have an average value that is bounded by parameters j and k and replaces the values of the state variables in the defined window space with the average value. The lossy compression also reduces any concurrent records having the same states into a single record. The combination of the lossy compression technique with simple run-length encoding results in a substantial reduction of the storage requirements for AETs.

Reference now being made to FIG. 4, a table is shown illustrating compression of the table of FIG. 3 using lossy compression according to the teachings of the present invention. The compression was completed using a defined window size of n=8 and parameters k=0.6 and j=0.4. The window size (n=8) is used to average the values of the state variables located within the window. For example, the first 8 states (clock cycles) of signal A are averaged (compressed) together for a resulting average of 0.5 (4/8). If the resulting average is >=to j (in this example 0.4) and <=k (in this example 0.6) then all the values for signal A in the window are replaced with the resulting average. If, however, the average is <j or >k then the values are left alone.

This process is repeated for each of the signals B-E. The window is then advanced 8 clock cycles (9-16) and the above process is repeated for each of the signals A-E for all clock cycles.

After the state variables have been averaged, each state variable (Signals A-E) row is examined for concurrent rows that can be combined into a single row.

Referring again to FIG. 2, the test harvesting continues by calculating the entropy for each state variable of the AET (Step 208). The entropy for a state variable is equal to the standard deviation of that state variable across all stored AET patterns for the design.

The entropies are then converted into a difference weight for each state variable. The conversion involves inverting the entropy value and scaling it according to a user selected importance. In the preferred embodiment of the present invention, the conversion of the entropy value is accomplished by inverting the cube of the entropy value (i.e., 1/entropy$^3$) (Step 210).

The weighted AET pattern is compared to the weighted stored AET patterns to determine if it is already sufficiently represented by comparing the difference to a threshold difference (Step 212). If the calculated amount of difference between the two weighted AET patterns is greater than the difference threshold then the two weighted AET patterns are considered different, and the AET pattern will define a new group and the difference threshold will be recalculated (Step 214), otherwise the two patterns are considered the same and the new AET pattern is added to the group containing the second AET pattern (Step 213). The test case harvesting continues by generating a new random test vector and repeating the process (Step 202).

The difference threshold is calculated to be the average difference of all AET pattern pairs under analysis. A weighted AET pattern group represents a weighted AET pattern if the weighted difference does not exceed the difference threshold when the weighted AET pattern is compared to all representatives of the group. If the weighted difference between the weighted AET pattern under analysis and the representatives of a weighted AET pattern group is less than the difference threshold, then it will fall into that group.

If the generated AET pattern is already sufficiently represented the test case harvesting continues to determine whether a sufficient number of AET patterns have been generated without resulting in the generation of any new AET patterns being stored (Step 216). If a sufficient number of random AET test vectors, as decided by the user, have been generated without resulting in the creation of any new AET groups then the verification of the design has a measured level of completeness (Step 218).

The resultant set of pattern groups correspond to a set of AETs that are grouped by similar simulation results. Additional regression runs to verify design updates (i.e., bug fixes) are initially performed with a representative of each pattern group before initiating random vector generation.

This approach dramatically increases the initial breadth of coverage, and decreases the time required to achieve all coverage goals and pattern group stability, thus, decreasing the time and resources required for regression.

A representative pattern can be a single pattern from each group, or all patterns from all groups. When a group is represented by a single pattern, that single pattern, and the state space surrounding it that is no more than the average difference away, defines the state space represented by the group. The single pattern can be an actual pattern captured during simulation or a pattern that is an aggregate representation of all the patterns included in the group.

Alternatively, all patterns can be saved and groups allocated dynamically to provide a more accurate representation of a group at the cost of computer storage space. In contrast, the singular pattern group representative saves computer storage space by only requiring one pattern stored per group but sacrifices accuracy.

DETAILED EXAMPLE

Reference now being made to FIG. 5, a table is shown illustrating the AET results of three test cases A, B, and C and the application of the test case harvesting of FIG. 2 according to the teachings of the present invention. The AET results have been illustrated as being stored without any lossy compression being applied (Steps 200-206 of FIG. 2)

Test cases A, B, and C represent three different random generated test vectors that were executed on the same design with the state variables control (CNTRL) and data (DATA) saved each clock cycle as indicated. State variable CNTRL represents the control unit of the design and DATA represents a random stream of data being operated on by the design. Since the CNTRL state variable indicates when the design is transitioning from one functional operation to another it should be considered more important than the DATA state variable in any difference calculation.

In this example, it can be assumed that AET of test case C has already been stored as a pattern that is part of a group and test cases A and B have been generated.

The test harvesting continues by calculating the entropy for the CNTRL and DATA state variables (Step 208). The entropy for a state variable is equal to the standard deviation of that state variable across all stored AET patterns for the design (i.e., in this example test cases A, B, and C).

The entropy for the CNTRL state variable is 0.27 and 0.50 for the DATA state variable (Step 208 of FIG. 2).

These entropies are then converted into a difference weight for each state variable. The conversion involves inverting the entropy value and scaling it according to importance. In the preferred embodiment of the present invention, the conversion of the entropy value is accomplished by inverting the cube of the entropy value (i.e., 1/entropy$^3$) (Step 210). In this example, the difference weight for the CNTRL state variable is 52.09 and 8.14 for the DATA state variable (Step 210 of FIG. 2)

The weighted differences are then calculated for the combinations of test case (A vs. B), (A vs. C), and (B vs. C). For example, on clock cycle 3, the weighted difference between the CNTRL and DATA state variables of A and B is 52.09. In this case, the CNTRL state variable is 1 for B and 0 for A resulting in a weighted difference of 52.09(abs(1−0))=52.09 for the CNTRL state variable. On cycle 3, the Data state variable is 0 for both A and B resulting in no difference (i.e., (8.14(abs(0−0)))). Adding up the total weighted differences for A vs. B test cases on clock cycle 3 is equal to 52.09+0=52.09.

On clock cycle 3, the weighted differences for A vs. C for the CNTRL signal is 52.09 (52.09(abs(0−1))), since A is 0 and C is 1. On clock cycle 3, the weighted differences for A vs. C for the DATA state variable is 8.14 (8.14(abs(0−1))), since A is 0 and C is 1. The total weighted differences for A vs. C test cases on clock cycle 3 is equal to 52.09+8.14=60.23.

This same process is repeated for each clock cycle for each test case comparison as illustrated in the table.

Reference now being made to FIG. 6, a table is shown illustrating the total weighted differences between the test cases A, B, and C of FIG. 5 according to the teachings of the present invention. As shown, the total difference of A vs. B is 584.08 with a threshold difference of 1.30 (the normalized difference=584.08/449(the average weighted difference)). The total difference of A vs. C is 551.57 with a threshold difference of 1.23. The total difference of B vs. C is 211.30 with a threshold difference of 0.47.

Any normalized difference that is greater than 1 is an indication that the two test cases are not representative of each other. In this example, test cases B and C are representative of each other and therefore, test case B is not stored. However, neither test case B or C are representative of test case A, and therefore, a new group is created and the AET state variables for test case A are saved (Steps 212-214).

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A method of verifying the design of an integrated circuit having one or more state variables, the method comprising the steps of:
    generating a first random vector;
    simulating the design with the first random vector to create a first set of values for the one or more state variables;
    comparing the first set of values with one or more groups each having one or more sets of stored values for the one or more state variables that were generated during a prior simulation of the design;
    storing the first set of values in the one or more groups if the first set of values are within a desired tolerance of the one or more sets of stored values.

2. The method of claim 1 wherein the step of comparing includes the step of:
    calculating an entropy for each of the one of the first set of values and stored set of values.

3. The method of claim 2 wherein the step of comparing includes the step of:
    weighting each one of the entropies according to a predetermined scheme.

4. The method of claim 3 wherein the step of comparing includes the step of:
    calculating the difference between the weighted entropies for the first set of values and the weighted entropies of the stored set of values.

5. The method of claim 4 wherein the step of storing includes the step of:
    storing the first set of values in the one or more groups if the calculated difference between the first set of values and one or more of the stored set of values is less than a desired tolerance.

6. The method of claim 5 wherein the desired tolerance is the normalized difference between the first set of values and the stored set of values.

7. The method of claim 6 wherein the step of storing includes the step of:
    compressing the first set of values and the stored set of values to reduce concurrent sets and average values.

8. The method of claim 7 wherein the step of compressing includes the step of:
    defining a window size for encompassing a portion of the first set of values and the stored set of values;
    averaging the values of the portion of the first set of values if the average of the first set of values is within a desired range; and
    averaging the values of the portion of the stored set of values if the average of the stored set of values is within a desired range.

9. The method of claim 1 further comprising the step of:
    generating a second random vector;
    simulating the design with the second random vector to create a second set of values for the one or more state variables;
    comparing the second set of values with the one or more groups; and
    determining that the second set of values reside within a desired tolerance of the one or more sets of stored values.

10. An apparatus for verifying the design of an integrated circuit having one or more state variables, the apparatus comprising:
    means for generating a first random vector;
    means for simulating the design with the first random vector to create a first set of values for the one or more state variables;
    means for comparing the first set of values with one or more groups each having one or more sets of stored values for the one or more state variables that were generated during a prior simulation of the design;
    means for storing the first set of values in the one or more groups if the first set of values are within a desired tolerance of the one or more sets of stored values.

11. The apparatus of claim 10 wherein the means for comparing includes:
    means for calculating an entropy for each of the one of the first set of values and stored set of values.

12. The apparatus of claim 11 wherein the means for comparing includes:
    means for weighting each one of the entropies according to a predetermined scheme.

13. The apparatus of claim 12 wherein the means for comparing includes:
    means for calculating the difference between the weighted entropies for the first set of values and the weighted entropies of the stored set of values.

14. The apparatus of claim 13 wherein the means for storing includes:
    means for storing the first set of values in the one or more groups if the calculated difference between the first set of values and one or more of the stored set of values is less than a desired tolerance.

15. The apparatus of claim 14 wherein the desired tolerance is the normalized difference between the first set of values and the stored set of values.

16. The apparatus of claim 15 wherein the means for storing includes:
means for compressing the first set of values and the stored set of values to reduce concurrent sets and average values.

17. The apparatus of claim 16 wherein the means for compressing includes:
means for defining a window size for encompassing a portion of the first set of values and the stored set of values;
means for averaging the values of the portion of the first set of values if the average of the first set of values is within a desired range; and
means for averaging the values of the portion of the stored set of values if the average of the stored set of values is within a desired range.

18. The apparatus of claim 10 further comprising:
means for generating a second random vector;
means for simulating the design with the second random vector to create a second set of values for the one or more state variables;
means for comparing the second set of values with the one or more groups; and
means for determining that the second set of values reside within a desired tolerance of the one or more sets of stored values.

19. A computer program product comprising a computer readable medium having computer readable program code for verifying the design of an integrated circuit having one or more state variables, the computer readable program code comprising:
computer readable program code for generating a first random vector;
computer readable program code for simulating the design with the first random vector to create a first set of values for the one or more state variables;
computer readable program code for comparing the first set of values with one or more groups each having one or more sets of stored values for the one or more state variables that were generated during a prior simulation of the design;
computer readable program code for storing the first set of values in the one or more groups if the first set of values are within a desired tolerance of the one or more sets of stored values.

20. The computer program product of claim 19 wherein the computer readable program code for comparing includes:
computer readable program code for calculating an entropy for each of the one of the first set of values and stored set of values.

21. The computer program product of claim 20 wherein the computer readable program code for comparing includes:
computer readable program code for calculating the difference between the weighted entropies for the first set of values and the weighted entropies of the stored set of values.

22. The computer program product of claim 21 wherein the desired tolerance is the normalized difference between the first set of values and the stored set of values.

23. The computer program product of claim 19 wherein the computer readable program code for comparing includes:
computer readable program code for weighting each one of the entropies according to a predetermined scheme.

24. The computer program product of claim 23 wherein the computer readable program code for storing includes:
computer readable program code for storing the first set of values in the one or more groups if the calculated difference between the first set of values and one or more of the stored set of values is less than a desired tolerance.

25. The computer program product of claim 24 wherein the computer readable program code for storing includes:
computer readable program code for compressing the first set of values and the stored set of values to reduce concurrent sets and average values.

* * * * *